United States Patent

Imachi et al.

(10) Patent No.: US 8,263,260 B2
(45) Date of Patent: Sep. 11, 2012

(54) METHOD OF MANUFACTURING POSITIVE ELECTRODE FOR NON-AQUEOUS ELECTROLYTE BATTERY, SLURRY USED THEREFOR, AND NON-AQUEOUS ELECTROLYTE BATTERY

(75) Inventors: Naoki Imachi, Moriguchi (JP);
Nobuhiro Sakitani, Moriguchi (JP);
Masaaki Tanaka, Moriguchi (JP)

(73) Assignee: SANYO Electric Co., Ltd., Osaka (JP)

(*) Notice: Subject to any disclaimer, the term of this patent is extended or adjusted under 35 U.S.C. 154(b) by 713 days.

(21) Appl. No.: 12/230,631

(22) Filed: Sep. 2, 2008

(65) Prior Publication Data

US 2009/0317718 A1    Dec. 24, 2009

(30) Foreign Application Priority Data

Sep. 4, 2007  (JP) .................................. 2007-228676

(51) Int. Cl.
*H01M 4/139* (2010.01)
(52) U.S. Cl. ............... 429/212; 429/223; 429/231.3; 29/623.5
(58) Field of Classification Search .......... 429/121–347; 29/623.1–623.5; 252/182.1
See application file for complete search history.

(56) References Cited

U.S. PATENT DOCUMENTS

| | | | |
|---|---|---|---|
| 5,932,632 A | 8/1999 | Biensan et al. | 523/161 |
| 2002/0034686 A1* | 3/2002 | Yamakawa et al. | 429/217 |
| 2004/0048160 A1* | 3/2004 | Omaru | 429/231.4 |
| 2006/0222952 A1 | 10/2006 | Kono et al. | 429/231.95 |

FOREIGN PATENT DOCUMENTS

| | | |
|---|---|---|
| JP | 08-069791 A | 3/1996 |
| JP | 10-074521 A | 3/1998 |
| JP | 11-067213 A | 3/1999 |
| JP | 2003-272619 | 9/2003 |
| JP | 2004-349079 | * 12/2004 |
| JP | 2006-134777 | 5/2006 |

OTHER PUBLICATIONS

Kawakami et al. JP 2004-349079. Dec. 2004. English machine translation by JPO.*
Office Action dated Jul. 3, 2012, in Japanese patent application No. 2007-228676 and partial English translation thereof.

* cited by examiner

*Primary Examiner* — Basia Ridley
*Assistant Examiner* — James Lee
(74) *Attorney, Agent, or Firm* — Kubovcik & Kubovcik

(57) ABSTRACT

A method of manufacturing a positive electrode for a non-aqueous electrolyte battery is provided. The positive electrode has a current collector and an active material layer formed on the current collector. The method includes: coating a slurry onto the current collector, the slurry having a pH of from 5 to 9 and containing a positive electrode active material, water as a dispersion medium, carboxymethylcellulose, and a pH adjuster; and drying the coated slurry to form the active material layer.

8 Claims, 1 Drawing Sheet

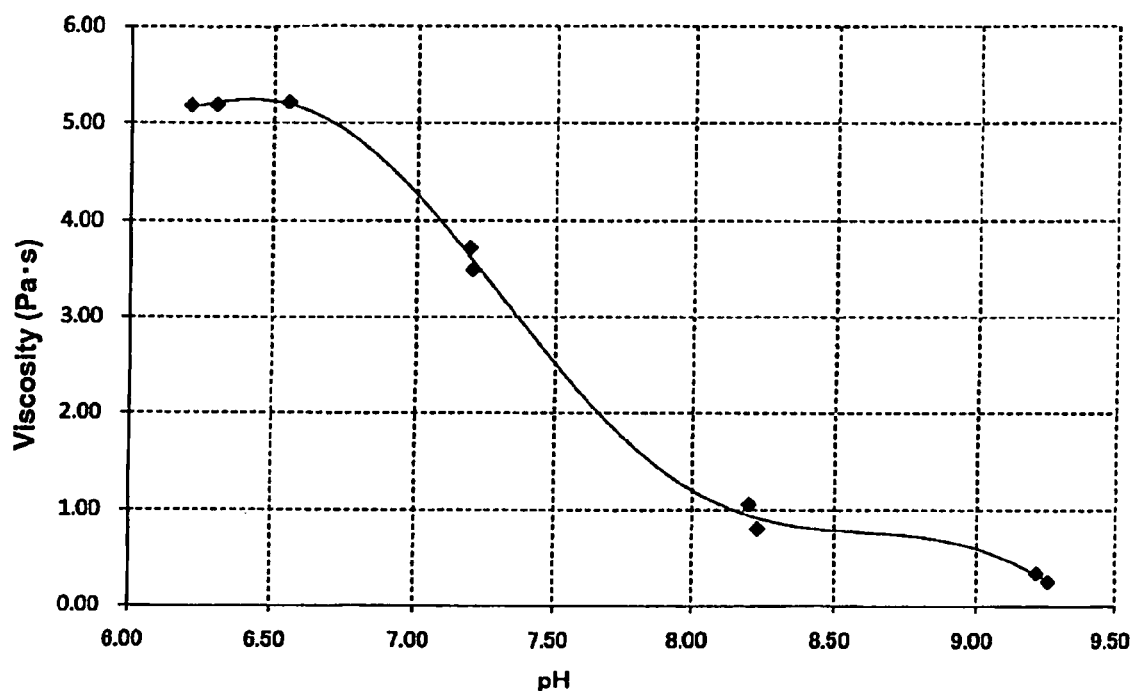

METHOD OF MANUFACTURING POSITIVE ELECTRODE FOR NON-AQUEOUS ELECTROLYTE BATTERY, SLURRY USED THEREFOR, AND NON-AQUEOUS ELECTROLYTE BATTERY

BACKGROUND OF THE INVENTION

1. Field of the Invention

The present invention relates to a method of manufacturing a positive electrode for a non-aqueous electrolyte battery, a slurry used therefor, and a non-aqueous electrolyte battery.

2. Description of Related Art

Lithium-ion secondary batteries achieve higher capacity and higher power relatively more easily than conventional secondary batteries. For this reason, the demands for lithium-ion secondary batteries have been increasing.

Many of the source materials for active materials of the lithium-ion secondary batteries have low durability against moisture. For this reason, slurries for forming electrodes have been prepared commonly using non-aqueous dispersion media, such as N-methylpyrrolidone (NMP), conventionally. However, the use of a non-aqueous dispersion medium raises the product cost of the slurry and increases also environmental impact. For this reason, the use of water as the dispersion medium has been desired since water has relatively low environmental impact and is available at low cost.

Graphite, for example, which is used as a negative electrode active material, is relatively stable against moisture. For this reason, aqueous dispersion media have been used for the negative electrode forming slurries containing graphite relatively early. Japanese Published Unexamined Patent Application No. 2003-272619 discloses a negative electrode forming slurry that uses an aqueous dispersion medium. Specifically, the just-mentioned patent application discloses that the pH of the negative electrode forming slurry is adjusted to 9 or higher using a pH adjuster.

On the other hand, positive electrode active materials are relatively unstable against moisture. For example, if water is used as the dispersion medium in the case that commonly used $LiCoO_2$ is used as the positive electrode active material, lithium ions in the active material react with water, producing LiOH, for example. This results in corrosion of the current collector. As a consequence, the problem arises that battery performance deteriorates. Thus, it has been difficult to use an aqueous dispersion medium for a positive electrode forming slurry.

In view of this problem, the development of a positive electrode active material that is relatively stable against moisture has been underway in recent years, in order to make it possible to use an aqueous dispersion medium for the positive electrode forming slurry. For example, Japanese Published Unexamined Patent Application No. 2006-134777 discloses $Li_xMPO_4$, where M is at least one kind of metal atom selected from the group consisting of Mn, Fe, Co, Ni, Cu, Mg, Zn, V, Ca, Sr, Ba, Ti, Al, Si, B, and Mo, and $0<x<2$, as the positive electrode active material with relatively high stability against moisture.

In addition, the just-mentioned patent application discloses that a water-soluble polymer is added as a thickening agent to a positive electrode forming slurry using an aqueous dispersion medium. The addition of a thickening agent as described in the just-mentioned patent application can increase the viscosity of the slurry. As a result, coatability of the slurry can be improved. In addition, the just-mentioned patent application shows carboxymethylcellulose (hereinafter also referred to as "CMC") as a specific example of the water-soluble polymer.

The present inventors have noticed, however, that dispersion stability, coatability, and adhesion strength of the positive electrode forming slurry become poor when CMC is used as a binder agent or a thickening agent for an aqueous slurry for a positive electrode active material such as lithium cobalt oxide. As a result of studies on the cause of this problem, the present inventors have found the following.

Lithium cobalt oxide is commonly produced by mixing a lithium source, such as a lithium hydroxide and a lithium carbonate, with a cobalt oxide, for example, and then sintering the mixture. When a lithium source and a cobalt oxide are mixed and sintered, the lithium source is usually added in excess of the cobalt oxide in order to prevent the cobalt oxide or the like from being left unreacted. As a consequence, the lithium source remains as a reaction residue.

Thus, lithium cobalt oxide generally shows mild alkalinity because of the lithium source added in an excess amount.

When CMC is used for an aqueous slurry in which such a lithium cobalt oxide is dispersed, sufficiently high viscosity cannot be obtained since CMC changes its viscosity greatly due to the pH of the slurry. This leads to the problems in dispersion capability, coatability, and adhesion strength.

It is an object of the present invention to provide a method of manufacturing a positive electrode for a non-aqueous electrolyte battery that is environmentally friendly and economical and that achieves excellent dispersion stability, coatability, and adhesion strength of the positive electrode forming slurry. It is also an object of the present invention to provide a slurry used therefor and to provide a non-aqueous electrolyte battery.

BRIEF SUMMARY OF THE INVENTION

The present invention provides a method of manufacturing a positive electrode for a non-aqueous electrolyte battery, the positive electrode having a current collector and an active material layer formed on the current collector, comprising: coating a slurry onto the current collector, the slurry having a pH of from 5 to 9 and comprising a positive electrode active material, water as a dispersion medium, carboxymethylcellulose, and a pH adjuster; and drying the coated slurry to form the active material layer.

The present invention also provides a slurry for manufacturing a positive electrode for a non-aqueous electrolyte battery, comprising a positive electrode active material, water as a dispersion medium, carboxymethylcellulose, and a pH adjuster, wherein the slurry has a pH of from 5 to 9.

A non-aqueous electrolyte battery according to the present invention comprises a positive electrode manufactured by the above-described manufacturing method of the present invention, a negative electrode, and a non-aqueous electrolyte.

The present invention makes it possible to manufacture a positive electrode for a non-aqueous electrolyte battery that is environmentally friendly and economical and that achieves excellent dispersion stability, coatability, and adhesion strength.

In addition, the positive electrode forming slurry according to the present invention is excellent in dispersion stability, coatability, and adhesion strength to the current collector.

The non-aqueous electrolyte battery according to the present invention is environmentally friendly and economical since it can be manufactured using the above-described manufacturing method according to the present invention.

BRIEF DESCRIPTION OF THE DRAWINGS

FIG. 1 is a graph illustrating the relationship between pH of a slurry versus viscosity of the slurry for the Examples and Comparative Examples.

DETAILED DESCRIPTION OF THE INVENTION

The present invention provides a method of manufacturing a positive electrode for a non-aqueous electrolyte battery, the positive electrode having a current collector and an active material layer formed on the current collector. The method comprises: coating a slurry onto the current collector, the slurry comprising a positive electrode active material, water as a dispersion medium, carboxymethylcellulose, and a pH adjuster, and having a pH of from 5 to 9; and drying the coated slurry to form the active material layer.

In the manufacturing method of the present invention, the slurry containing carboxymethylcellulose (CMC) contains a pH adjuster so that the pH is adjusted to be from 5 to 9. Since the pH is within the range of from 5 to 9, the slurry containing CMC can have a high viscosity. Accordingly, the slurry has excellent dispersion stability, coatability, and adhesion strength, and a positive electrode for a non-aqueous electrolyte battery can be manufactured stably and easily.

When the pH of the slurry is less than 5 in the step of coating, part of CMC changes into carboxymethylcellulose acid. The carboxymethylcellulose acid is insoluble in water, and therefore, the carboxymethylcellulose acid precipitates in the slurry when the pH of the slurry becomes less than 5 in the coating step, making it difficult to obtain a uniform slurry. From the viewpoint of more effectively preventing part of CMC from changing into carboxymethylcellulose acid, it is preferable that the pH of the slurry in the coating step be equal to or greater than 7.

On the other hand, when the pH of the slurry in the coating step is greater than 9, the viscosity of the slurry tends to decrease. Accordingly, the coatability of the slurry becomes poor. It should be noted that the reason why the viscosity of the slurry decreases is that CMC undergoes depolymerization when the pH of the slurry is greater than 9.

Presuming the viscosity decrease that occurs in the process step of kneading the positive electrode active material and CMC in advance, it may appear conceivable to adjust the viscosity of the slurry by adjusting the amount of water content. In that case, however, the viscosity of the CMC becomes very high prior to the kneading with the positive electrode active material. As a consequence, the kneading of the positive electrode active material and the CMC becomes difficult at the initial stage.

Also, in the case that the viscosity of the slurry is low, it may appear possible to carry out the coating step and the drying step a plurality of times in order to increase the thickness of the active material layer. However, when the coating step and the drying step are carried out a plurality of times, unevenness across the thickness occurs in the active material layer, which is undesirable. It is preferable that, as in the present invention, the viscosity of the slurry be made high and the coating step be carried out only one time.

The method of manufacturing a positive electrode for a non-aqueous electrolyte battery according to the present invention employs water as the dispersion medium. For this reason, the environmental impact can be reduced in comparison with the case that an organic solvent is used as the dispersion medium. Moreover, the use of water, which is low in cost, serves to reduce the manufacturing cost of the positive electrode for a non-aqueous electrolyte battery.

Binder Agent

The CMC contained in the slurry serves as a thickening agent for the slurry and also as a binder agent for the positive electrode active material layer. For this reason, the binding strength in the positive electrode can be enhanced by adding CMC to the slurry. From the viewpoint of improving the binding strength in the positive electrode further, it is preferable that the content of CMC in the positive electrode active material layer be 0.2 weight % or greater. On the other hand, it is preferable that the content of CMC in the positive electrode active material layer be 0.5 weight % or less. When the content of CMC in the positive electrode active material layer is greater than 0.5 weight %, the lithium-ion intercalation and deintercalation capability of the positive electrode active material may become poor, resulting in poor battery performance.

The slurry may contain another binder agent in addition to the CMC. This further improves the binding strength in the obtained positive electrode and also achieves an improvement in the flexibility of the positive electrode. Preferable examples of the binder agent other than CMC include styrene-butadiene rubber (SBR), polytetrafluoroethylene (PTFE), polyacrylonitrile (PAN), modified substances thereof, derivatives thereof, copolymers containing acrylonitrile units, and polyacrylic acid derivatives. It is preferable that the content of the binder agent other than the CMC in the positive electrode active material layer be from 0.5 weight % to 1.5 weight %. By adding the binder agent other than the CMC in an amount of 0.5 weight % or more to the slurry, the binding strength and the flexibility of the positive electrode can be improved further. In addition, by setting the amount of the added binder agent other than CMC to the slurry to 1.5 weight % or less, the lithium-ion intercalation and deintercalation capability of the positive electrode active material can be enhanced in the positive electrode.

pH Adjuster

Although the type of the pH adjuster is not particularly limited, it is preferable that the pH adjuster be a water-soluble substance showing mild acidity. If a strong acid such as hydrochloric acid or sulfuric acid is added as the pH adjuster, there is a risk that it may dissolve the positive electrode active material.

Specific examples of the water-soluble substance showing mild acidity include water-soluble organic acids. Examples of the water-soluble organic acids include organic compounds having an acid group such as a carboxylic group, a phosphate group, and a sulfonate group. Among them, particularly preferable is an organic compound having a carboxylic group. Specific examples of the compound having a carboxylic group include succinic acid, phthalic acid, maleic acid, succinic anhydride, phthalic anhydride, and maleic anhydride. By drying these compounds, these compounds may be formed into an acid anhydride, which causes little adverse effect in the battery. In addition, by using these compounds, it is possible to form a surface film of the compound on the positive electrode surface.

It should be noted that the pH adjuster may be such an agent that decomposes or vaporizes in the drying step, for example. In this case, the pH adjuster does not remain in the obtained positive electrode. A specific example of the pH adjuster that decomposes or vaporizes in the drying step is acetic acid.

It is preferable that the amount of the pH adjuster added be from 0.1 weight % to 0.5 weight % with respect to the weight of the positive electrode mixture. Accordingly, it is preferable that the pH adjuster be added in the range of from 0.1 parts by weight to 0.5 parts by weight, with respect to 100 parts by weight of the positive electrode mixture. It should be noted that the positive electrode mixture herein means the total amount of the material that constitutes the positive electrode active material layer, including the positive electrode active material and the addition agents such as binder agents and conductive agents. When the amount of the pH adjuster added is less than 0.1 weight % with respect to the positive electrode mixture, it tends to be difficult to adjust the pH of the slurry appropriately. On the other hand, it is sufficient that the amount of the pH adjuster added is 0.5 weight % or less with respect to the positive electrode mixture. When the amount of the pH adjuster added exceeds 0.5 weight % with respect to the positive electrode mixture, the performance of the battery that employs the resultant positive electrode may be degraded.

Degree of Etherification of CMC

The viscosity of a CMC aqueous solution is correlated with the degree of etherification of CMC. Herein, the term "degree of etherification" means the number of substituting ethers in the three hydroxy groups contained in the cellulose unit of the CMC.

Specifically, the less the degree of etherification of the CMC, the higher the viscosity of the CMC aqueous solution will be. This is because the number of the intramolecular hydrogen bonds of CMC increases. From the viewpoint of keeping the viscosity of the slurry appropriate, it is preferable that the degree of etherification of CMC be from 0.5 to 1.5, and more preferably from 0.65 to 0.75.

When the degree of etherification of CMC is less than 0.5, the solubility of CMC to water tends to be insufficient. This makes it difficult to prepare a uniform slurry, which is undesirable. From the viewpoint of achieving good coatability of the slurry and from the viewpoint of keeping the water-solubility of CMC higher, it is preferable that the degree of etherification of CMC be 0.65 or higher.

On the other hand, if the degree of etherification of CMC is higher than 1.5, the viscosity of the slurry tends to degrade. As a consequence, the coatability of the slurry tends to degrade. From the viewpoint of achieving better coatability of the slurry, it is more preferable that the degree of etherification of CMC be 0.75 or less.

Although the details are not clear, the binding capability in the obtained positive electrode is greatly influenced by the degree of etherification of CMC. Specifically, the lower the degree of etherification of CMC, the greater the binding capability in the positive electrode. For this reason, also from the viewpoint of further improving the binding strength in the positive electrode obtained, it is preferable that the degree of etherification of CMC be 1.5 or less, or more preferably 0.75 or less. Accordingly, it is particularly preferable that the degree of etherification of CMC be from 0.65 to 0.75.

Positive Electrode Active Material

In the present invention, the type of positive electrode active material is not particularly limited. However, the present invention is particularly useful when the slurry containing a positive electrode active material shows strong alkalinity. For example, the present invention is particularly useful when the positive electrode active material is a layered lithium-transition metal composite oxide or an olivine-type lithium phosphate compound that contains a transition metal, such as cobalt and nickel, along with lithium. Specific examples of the oxide containing cobalt or nickel include lithium-containing cobalt oxide, lithium-containing nickel oxide, lithium cobalt-nickel-manganese composite oxide, lithium-nickel-manganese-aluminum composite oxide, and lithium-nickel-cobalt-aluminum composite oxide. A specific example of the olivine-type lithium phosphate compound is olivine-type lithium iron phosphate.

In the present invention, the slurry for manufacturing a positive electrode for a non-aqueous electrolyte battery comprises a positive electrode active material, water as a dispersion medium, carboxymethylcellulose, and a pH adjuster, and the slurry has a pH of from 5 to 9.

The slurry according to the present invention, for manufacturing a positive electrode for a non-aqueous electrolyte battery, has a relatively high viscosity because it contains CMC and has a pH of from 5 to 9. Therefore, the slurry for forming a positive electrode of a non-aqueous electrolyte battery according to the present invention is excellent in dispersion stability, coatability, and adhesion strength to the current collector.

A non-aqueous electrolyte battery according to the present invention comprises a positive electrode manufactured by the above-described manufacturing method of the present invention, a negative electrode, and a non-aqueous electrolyte.

As described above, the present invention makes it possible to manufacture a positive electrode for a non-aqueous electrolyte battery that is environmentally friendly and economical and that achieves excellent dispersion stability, coatability, and adhesion strength. Accordingly, the non-aqueous electrolyte battery according to the present invention has low environment impact when manufactured, and it can be easily manufactured.

Negative Electrode

The negative electrode is not particularly limited and may be any known negative electrode fabricated in a conventional known method. For example, the negative electrode may be fabricated as follows. A negative electrode active material, a binder agent, a thickening agent, and the like are added to a dispersion medium such as water or an organic solvent, and the mixture is kneaded to prepare a negative electrode forming slurry. The resultant slurry is coated onto a current collector and then dried, whereby a negative electrode is formed. From the viewpoint of reducing the environmental impact, it is preferable to use water as the dispersion medium. The type of the negative electrode active material is not particularly limited. Usable examples of the negative electrode active material include artificial graphite, natural graphite, coke, tin oxide, metallic lithium, silicon, and mixtures thereof.

Non-aqueous Electrolyte Solution

The type of the non-aqueous electrolyte solution may be, but is not particularly limited to, an electrolyte solution in which a supporting salt such as lithium salt is dissolved and mixed in a non-aqueous solvent. Specific examples of the lithium salt include $LiPF_6$, $LiBF_4$, $LiN(SO_2CF_3)_2$, $LiN(SO_2C_2F_5)_2$, $LiPF_{6-x}(C_nF_{2n+1})_x$ (where $1<x<6$ and $n=1$ or 2), and mixtures thereof. The concentration of the supporting salt may be, but is not particularly limited to, in the range of from about 1.0 mol to 1.8 mol per 1 liter of the electrolyte solution. Specific examples of the non-aqueous solvent used for the non-aqueous electrolyte solution include carbonate-based solvents such as ethylene carbonate (EC), diethylene carbonate (DEC), propylene carbonate (PC), γ-butyrolactone (GBL), diethyl carbonate (DEC), dimethyl carbonate (DMC), ethyl methyl carbonate (EMC), and mixtures thereof. A specific example of the mixed solvent is a solvent in which ethylene carbonate (EC) and diethylene carbonate (DEC) are mixed in a volume ratio of EC:DEC=3:7. Among the carbonate-based solvents, a mixed solvent of a cyclic carbonate-based solvent and a chain carbonate-based solvent is particularly preferable.

The present invention is useful in manufacturing non-aqueous electrolyte secondary batteries, which are used as driving power sources for mobile information terminals such as mobile telephones, notebook computers, and PDAs, as well as high power driving power sources for, for example, HEVs and power tools.

EXAMPLES

Hereinbelow, the present invention will be described in detail based on examples thereof. It should be construed, however, that the following examples are merely illustrative and the present invention is not limited to the following examples.

Example 1

First, CMC (made by Dai-ichi Kogyo Seiyaku Corp. under the trade name "BSH-12", degree of etherification: 0.65 to 0.75) was provided. Using a mixer (made by Primix Corp. under the trade name "Homomixer"), the CMC was dissolved in deionized water with a pH of 5.40, to obtain a 0.8 weight % CMC aqueous solution. It should be noted that since the deionized water shows a pH of 5.40 due to the dissolution of carbonic acid gas and the CMC aqueous solution shows mild acidity from the beginning, the mild alkalinity of the slurry in which an olivine-type lithium iron phosphate has been added as the positive electrode active material will be somewhat alleviated.

Next, succinic anhydride was added as a pH adjuster to the resultant CMC aqueous solution. The succinic anhydride was added in amount of 0.1 parts by weight with respect to 100 parts by weight of the positive electrode mixture.

Next, 969 g of an olivine-type lithium iron phosphate ($LiFePO_4$, average particle size: 0.5 μm, 5 weight % carbon-coated product), 19 g of graphite (the conductive agent made by Nippon Graphite Industries under the trade name of "HS-100"), and 375 g of the CMC solution to which succinic anhydride had been added, were mixed using a mixer (made by Primix Corp. under the trade name of "Homomixer"). The mixing was performed at 50 rpm for 60 minutes.

Thereafter, in order to adjust the viscosity, 15 g of deionized water with a pH of 5.40 was added to the resultant mixture and mixed using a mixer (made by Primix Corp. under the trade name of "Homomixer"). The mixing was performed at 50 rpm for minutes.

Further, 18 g of styrene-butadiene rubber (SBR) with a solid content of 50 weight % was added to the resultant mixture and then mixed using a mixer (made by Primix Corp. under the trade name of "Homomixer"), to prepare a positive electrode forming slurry. The mixing was performed at 30 rpm for 45 minutes.

The weight ratio of the resultant slurry was $LiFePO_4$:HS-100 CMC:SBR=96.9:1.9:0.3:0.9.

The resultant slurry was coated onto one side of an aluminum foil serving as a current collector by doctor blading and then dried at 80° C. The amount of the coated slurry was 50 mg/10 $cm^2$. Thereafter, the resultant material was pressure-rolled at 3.60 g/ml, to thus complete appositive electrode plate.

Using a centrifugal separator made by Kokusan Corp, 150 g of the slurry used for preparing the positive electrode plate was separated into solids content and supernatant liquor. The separation was performed at 5,000 rpm for 10 minutes. The obtained supernatant liquor was filtered using filter paper. The pH of the filtrate was measured using a pH meter. (pH meter made by Horiba Ltd. under the trade name of "F22"), and the measurement result was defined as the pH of the slurry. The pH of the obtained slurry was 8.2.

In addition, the viscosity of the slurry used for preparing the positive electrode plate was measured using a viscometer (made by A&D Corp. under the trade name of "Vibro Viscometer SV-10") The temperature during the viscosity measurement was 22° C.

Furthermore, a coating test for the slurry used for preparing the positive electrode plate was conducted using a bar coater. Specifically, the slurry was coated with setting the gap at 200 μm and 300 μm. Then, the weight of the coated slurry per 10 $cm^2$ was measured.

Further, a peel test for the active material layer of the positive electrode plate was carried out. The peel test was performed using compression testers (made by Imada Seisakusho under the trade name of "SV-5" and "DRS-5R"). Specifically, a circular test piece provided with a 3 $cm^2$ adhesive tape (made by 3M Corp. under the trade name of "Scotch Double-coated Tape 666") was pressed against the coated surface of the obtained positive electrode plate, and pulled upward at a constant speed of 300 mm/min. Thus, at the time when the active material layer was peeled off from the current collector, the load applied to the above-described device was measured. This measurement was conducted for 20 samples, and the mean value was calculated.

The pH, viscosity, coating test result, and peel strength measured in the above-described manner are shown in Table 1 below and FIG. 1.

Example 2

Preparation of a Positive Electrode, Measurements of the pH and the viscosity, and a coating test were carried out in the same manner as described in Example 1 above, except that the amount of succinic anhydride added was set at 0.5 weight %. The results are shown in Table 1 below and FIG. 1.

Example 3

Preparation of a Positive Electrode, Measurements of the pH and the viscosity, and a coating test (but only with a gap of 200 μm) were carried out in the same manner as described in Example 1 above, except that the amount of succinic anhydride added was set at 1.0 weight %. The results are shown in Table 1 below and FIG. 1.

Example 4

Preparation of a Positive Electrode, Measurements of the pH and the viscosity, and a coating test (but only with a gap of 200 μm) were carried out in the same manner as described in Example 3 above, except that the pH adjuster was changed from the succinic anhydride to maleic anhydride. The results are shown in Table 1 below and FIG. 1.

Example 5

Preparation of a Positive Electrode, Measurements of the pH and the viscosity, and a coating test (but only with a gap of 200 μm) were carried out in the same manner as described in Example 3 above, except that the pH adjuster was changed from the succinic anhydride to phthalic anhydride. The results are shown in Table 1 below and FIG. 1.

Example 6

Preparation of a Positive Electrode and Measurements of the pH and the viscosity as well as a coating test and a peel test were carried out in the same manner as described in Example 1 above, except that CMC Product Number 1380 made by Daicel Chemical Industries, Ltd. with a degree of etherification of from 1.00 to 1.50 was used as the CMC. The results are shown in Table 1 below and FIG. 1.

Example 7

Preparation of a Positive Electrode, Measurements of the pH and the viscosity, and a coating test were carried out in the same manner as described in Example 6 above, except that the amount of succinic anhydride added was set at 0.5 weight %. The results are shown in Table 1 below and FIG. 1.

Comparative Example 1

Preparation of a Positive Electrode and Measurements of the pH and the viscosity as well as a coating test and a peel test were carried out in the same manner as described in Example 1 above, except that no pH adjuster was added. The results are shown in Table 1 below and FIG. 1.

At an early stage of mixing of the CMC aqueous solution and the olivine-type lithium iron phosphate, the viscosity of the mixture was relatively high because the influence of the olivine-type lithium iron phosphate on the CMC was insignificant. However, as the mixing proceeded, the viscosity of the slurry lowered, and lastly, the viscosity fell to such a viscosity that the coating process could not be performed.

Comparative Example 2

Preparation of a Positive Electrode and Measurements of the pH and the viscosity as well as a coating test and a peel test were carried out in the same manner as described in Example 6 above, except that no pH adjuster was added. The results are shown in Table 1 below and FIG. 1.

In this Comparative Example 2 as well as Comparative Example 1 above, the viscosity of the slurry lowered as the mixing proceeded, and lastly, the viscosity fell to such a viscosity that the coating process could not be performed.

slurry is greater than 9, the viscosity of the slurry becomes extremely low, greatly degrading the coatability. In Comparative Examples 1 and 2, in which the pH of the slurry exceeded 9, the coating amount showed little difference between when the gap was 200 μm and when the gap was 300 μm. From this result, it was found that the pH of the slurry should preferably be 9 or less. On the other hand, it was shown that when the pH of the slurry is equal to or less than 7, the viscosity of the slurry becomes higher, and that when the pH is equal to or less than 6.55, the viscosity of the slurry becomes especially high. However, as has been mentioned previously, it is preferable that the pH of the slurry be equal to or higher than 7, from the viewpoint of more effectively preventing part of the CMC from changing into carboxymethylcellulose acid. Thus, it is particularly preferable that the pH of the slurry be within the range of from 7 to 9.

As seen from Table 1, Example 1, in which the degree of etherification is relatively low, 0.65 to 0.75, shows a relatively high viscosity 1.06 Pa·s. On the other hand, Example 6, which has a relatively high degree of etherification of from 1.00 to 1.50, shows a relatively low viscosity 0.81 Pa·s. These results demonstrate that the less the degree of etherification of CMC is, the higher the viscosity of the slurry-will be.

Moreover, as seen from Table 1, Examples 1 and 6, in which the pH adjuster was contained and the pH of the slurry was equal to or less than 9, yielded relatively high peel strengths, greater than 5,000 g. In contrast, Comparative Examples 1 and 2, in which no pH adjuster was contained and the pH of the slurry exceeded 9, showed relatively low peel strength, less than 900. These results demonstrate that a high peel strength can be obtained by adding a pH adjuster to the slurry and controlling the pH of the slurry to be equal to or less than 9. It is believed that the reason why the peel strength becomes low when using a slurry having a high pH is that the CMC undergoes depolymerization in the slurry having a high pH.

Comparative Example 3

Succinic anhydride was added as the pH adjuster to the 0.8 weight % CMC aqueous solution used in Example 1 until the

TABLE 1

| | | Example | | | | | | | Comparative Example | |
|---|---|---|---|---|---|---|---|---|---|---|
| | | 1 | 2 | 3 | 4 | 5 | 6 | 7 | 1 | 2 |
| pH adjuster | Type | Succinic anhydride | Succinic anhydride | Succinic anhydride | Maleic anhydride | Phthalic anhydride | Succinic anhydride | Succinic anhydride | | |
| | Amount added (wt. %) | 0.1 | 0.5 | 1.0 | 1.0 | 1.0 | 0.1 | 0.5 | | |
| Degree of etherification | | 0.65-0.75 | 0.65-0.75 | 0.65-0.75 | 0.65-0.75 | 0.65-0.75 | 1.00-1.50 | 1.00-1.50 | 0.65-0.75 | 1.00-1.50 |
| pH | | 8.20 | 7.19 | 6.30 | 6.55 | 6.21 | 8.23 | 7.20 | 9.21 | 9.25 |
| Viscosity (Pa·S) | | 1.06 | 3.72 | 5.19 | 5.21 | 5.18 | 0.81 | 3.49 | 0.35 | 0.26 |
| Amount of coating (mg) | gap: 200 μm | 117 | 191 | 221 | 218 | 226 | 103 | 179 | 57 | 41 |
| | gap: 300 μm | 172 | 302 | — | — | — | 121 | 278 | 62 | 49 |
| Peel strength | | 5621 | — | — | — | — | 5113 | — | 862 | 779 |

As shown in Table 1 and FIG. 1, it was demonstrated that, as the pH of the slurry increases, the viscosity of the slurry decreases. Accordingly, the amount of coating in the coating test correspondingly reduces, which shows that the coatability lowers. In particular, it was shown that, when the pH of the pH of the aqueous solution became less than 5. Consequently, a solid substance precipitated in the aqueous solution, so a uniform aqueous solution could not be obtained. From this result, it was found that the pH of the slurry should preferably be equal to or greater than 5.

Measurement of pH of Various Positive Electrode Active Materials Dispersed in Solution 5 g of each of various positive electrode active materials was dispersed in 95 g of tap water and thereafter filtered using filter paper. Thereafter, the pH of each of the obtained filtrates was measured in the same manner as described in Example 1. The measurement results were:

Lithium cobalt oxide: approx. 10.5 to 11.5,
$LiNi_{1/3}Co_{1/3}Mn_{1/3}O_2$: approx. 10.8 to 12.0,
Olivine-type lithium iron phosphate: approx. 10 to 13, and
Spinel-type lithium manganese oxide: approx. 8 to 10.

As will be appreciated from the results, the oxides containing cobalt and nickel, and the olivine-type lithium compound show relatively high pHs. Therefore, when these substances are used as a positive electrode active material, the pH of the slurry tends to become relatively high, and the viscosity of the slurry tends to become low. Thus, the present invention is particularly useful with these substances.

Measurement Method for Degree of Etherification of CMC

The degree of etherification of CMC may be determined as follows.

0.6 g of CMC in a dry condition is wrapped by filter paper, and carbonized in a porcelain crucible. The carbonized CMC is cooled, and then put in a 500 mL beaker. Thereafter, 250 mL of water and 35 mL of N/10 sulfuric acid are added thereto, followed by boiling for 30 minutes. After cooling the boiled solution, a phenolphthalein indicator is added to the cooled solution, and the solution is back titrated with N/10 potassium hydroxide. From the results, the degree of etherification of the CMC can be calculated using the following two equations (1) and (2):

$$A=(af-bf')/(weight(g) \text{ of CMC})-alkalinity \quad (1)$$

$$\text{Degree of etherification}=(162 \times A)/(10,000-80A) \quad (2).$$

In the equations,
A: amount of N/10 sulfuric acid consumed by the bonded alkali per 1 g of CMC (mL),
a: amount of N/10 sulfuric acid consumed (mL),
f: titer of N/10 sulfuric acid,
b: titration amount (mL) of N/10 potassium hydroxide,
f': titer of N/10 potassium hydroxide,
162: molecular weight (Mw) of glucose, and
80: molecular weight (Mw) of $CH_2COONa-H$.

Fabrication of Non-aqueous Electrolyte Secondary Battery

Preparation of Positive Electrode

A positive electrode plate prepared in the manner described in Example 1 was used as the positive electrode.

Preparation of Negative Electrode

The CMC as used in the preparation of the positive electrode in Example 1 was dissolved in deionized water, whereby a CMC aqueous solution with a concentration of 1.0 weight % was obtained.

Then, 980 g of artificial graphite (average particle size 21 im, surface area 4.0 m²/g) was added to 1,250 g of the obtained 1.0 weight % CMC aqueous solution and they were mixed using a mixer (made by Primix Corp. under the trade name of "Hivis Mix"), whereby a negative electrode forming slurry was prepared. The mixing was performed at 50 rpm for 60 minutes.

Next, 500 g of deionized water was added to the mixture in order to adjust the viscosity, and the resultant mixture was mixed using the same mixer at 50 rpm for 10 minutes. Next, 20 g of SBR (solid content: 50 weight %) was added thereto, and the resultant mixture was mixed using the same mixer at 30 rpm for 45 minutes. Thus, a negative electrode slurry was prepared.

The weight ratio of the resultant slurry was artificial graphite: CMC:SBR=98.0:1.0:1.0.

The resultant slurry was coated using reverse coating, then dried, and pressure-rolled, whereby a negative electrode plate was completed. It should be noted that the capacity ratio of the positive electrode to the negative electrode (positive electrode:negative electrode) was adjusted to be 1.0:1.10.

Preparation of Non-Aqueous Electrolyte

Lithium hexafluorophosphate $LiPF_6$ was dissolved at a concentration of 1.0 mol/L in a mixed solvent of 3:7 volume ratio of ethylene carbonate (EC) and diethyl carbonate (DEC) to prepare a non-aqueous electrolyte solution.

Construction of Battery

A non-aqueous electrolyte secondary battery was prepared using the positive electrode, the negative electrode, and the non-aqueous electrolyte solution that were prepared as described above. Respective lead terminals were attached to the positive electrode and the negative electrode. The positive electrode and the negative electrode were wound in a spiral form with a separator interposed therebetween. The wound electrodes were then pressed into a flat shape to form an electrode assembly. This electrode assembly was inserted into a battery case made of an aluminum laminate. Then, the battery case was filled with the non-aqueous electrolyte solution and then sealed. Thereby, a non-aqueous electrolyte secondary battery was completed The design capacity of the battery was 650 mAh. The design capacity of the battery was determined with reference to an end-of-charge voltage of 4.2 V.

Evaluation of Battery Performance

The battery was charged at a constant current of 1 It (650 mA) to 4.2 V and further charged at a constant voltage of 4.2 V to a current of 1/20 It (32.5 mA). The battery was rested for 10 minutes and thereafter discharged at a constant current of 1 It (650 mA) to 2.75 V.

As a result of the above-described charge-discharge test, it was confirmed that the test battery yielded substantially the same charge-discharge capacity and capacity retention ratio as the non-aqueous electrolyte secondary battery that employed a positive electrode prepared using a slurry containing polyvinylidene fluoride (PVDF) as the binder agent and MMP as the solvent. Thus, it was confirmed that the test battery had no problem in electrochemical characteristics.

As has been described above, the present invention makes available a method of manufacturing a positive electrode for a non-aqueous electrolyte battery, that is environmentally friendly and economical and that achieves excellent dispersion stability, coating stability, and adhesion strength.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

The present application claims priority based on Japanese Patent Application No. 2007-228676 filed Sep. 4, 2007, and which is incorporated herein by reference.

What is claimed is:

1. A method of manufacturing a positive electrode for a non-aqueous electrolyte battery, the positive electrode having a current collector and an active material layer formed on the current collector, the method comprising:

coating a slurry onto the current collector, the slurry having a pH of from 5 to 9 and comprising a positive electrode active material selected from the group consisting of a lithium-containing cobalt oxide, a lithium-containing nickel oxide, and an olivine-type, lithium phosphate compound, water as a dispersion medium, carboxymethylcellulose, and a pH adjuster which is a water-soluble organic acid selected from the group consisting of succinic acid, phthalic acid, maleic acid, succinic anhydride, phthalic anhydride, maleic anhydride; organic compounds having a phosphate group, and organic compounds having a sulfonate group; and drying the coated slurry to form the active material layer.

2. A method of manufacturing a positive electrode for a non-aqueous electrolyte battery, the positive electrode having a current collector and an active material layer formed on the current collector, the method comprising:

coating a slurry onto the current collector, the slurry having a pH of from 7 to 9 and comprising a positive electrode active material selected from the group consisting of a lithium-containing cobalt oxide, a lithium-containing nickel oxide, and an olivine-type lithium phosphate compound, water as a dispersion medium, carboxymethylcellulose, and a pH adjuster which is a water-soluble organic acid selected from the group consisting of succinic acid, phthalic acid, maleic acid, succinic anhydride, phthalic anhydride, maleic anhydride; organic compounds having a phosphate group, and organic compounds having a sulfonate group; and drying the coated slurry to form the active material layer.

3. The method according to claim 1 or 2, wherein the amount of the pH adjuster added is from 0.1 weight % to 0.5 weight % with respect to the amount of a positive electrode mixture.

4. The method according to claim 1 or 2, wherein the carboxymethylcellulose has a degree of etherification of from 0.5 to 1.5.

5. The method according to claim 4, wherein the carboxymethylcellulose has a degree of etherification of from 0.65 to 0.75.

6. The method according to claim 1 or 2, wherein the positive electrode active material is an olivine-type lithium iron phosphate.

7. A slurry for manufacturing a positive electrode for a non-aqueous electrolyte battery, comprising:

a positive electrode active material selected from the group consisting of a lithium-containing cobalt oxide, a lithium-containing nickel oxide, and an olivine-type lithium phosphate compound, water as a dispersion medium, carboxymethylcellulose, and a pH adjuster which is a water-soluble organic acid selected from the group consisting of succinic acid, phthalic acid, maleic acid, succinic anhydride, phthalic anhydride, maleic anhydride; organic compounds having a phosphate group, and organic compounds having a sulfonate group; and the slurry having a pH of from 5 to 9.

8. A non-aqueous electrolyte battery comprising: a positive electrode manufactured according to a method according to claim 1 or 2, a negative electrode, and a non-aqueous electrolyte.

* * * * *